United States Patent Office 3,435,254
Patented Mar. 25, 1969

3,435,254
SYSTEM FOR CONTROLLING THYRISTORS BY PERIODICALLY RECURRING FIRING PULSES
Werner Volkmann, Erie, Pa., assignor to Siemens Aktiengesellschaft, Munich, Germany
Filed Aug. 6, 1965, Ser. No. 477,903
Claims priority, application Germany, Aug. 6, 1964, S 92,496
Int. Cl. H03k 17/54
U.S. Cl. 307—252           3 Claims

ABSTRACT OF THE DISCLOSURE

In a system for controlling a thyristor by periodically recurring firing pulses, an amplifier circuit has an input connected to a variable control voltage supply for controlling the charging of a capacitor. The amplifier circuit includes a control device for abruptly increasing the output voltage of the amplifier circuit to a value above a maximum capacitor voltage. The control device is connected to the thyristor for controlling the output voltage in dependence upon the blocking voltage of the thyristor.

*Description of the invention*

My invention relates to a system for controlling thyristors by periodicaly recurring firing pulses.

The performance of thyristors, such as silicon controlled rectifiers and other semiconductor devices operating as latching switches, is comparable with that of controllable gas discharge tubes or thyratrons. Thus, thyristors are applicable in a similar manner for controlling direct and alternating currents on the delayed commutation or phase control principle. For this purpose, thyristors, like thyratrons, are triggered into conductance by supply of a firing pulse, and then remain latched in conductive condition until the current amplitude, depending upon feeder voltage and load, has declined below a critical value close to zero. A substantially continuous variation of the load current or load voltage by varying the phase position of the firing pulses is possible only within the positive halfwave of the periodic feeder voltage.

Numerous methods and circuits are known for producing the periodically recurring firing pulses required for such phase control purposes. In most cases, these circuits have a trigger stage which provides a firing pulse whenever a controlling input voltage reaches a given limit value. The input voltage for the trigger stage may be supplied, for example, as a sawtooth voltage with a superimposed variable direct control voltage, the frequency of the sawtooth voltage corresponding to that of the feeder voltage.

Another, rather simple method is to tap the input voltage for the trigger stage from a capacitor charged through a load resistor from a constant voltage and connected parallel to a transistor which assists in continuously varying the steepness of the increasing capacitor charge voltage under control by a direct voltage. The charging of the capacitor always commences at the beginning of each second half wave during which the firing is to occur. The capacitor is therefore discharged shortly prior to the desired instant of firing and the discharge is supposed to occur with the shortest possible time.

The latter method of varying the time position of the firing pulses is readily applicable in cases where the cycle period of the feeder voltage is constant. Under such conditions there exists a fixed time relation between the control voltage applied to the transistor and the phase angle of the firing pulse relative to the feeder voltage. Such correlation, however, is not secured if the cycle period of the feeder voltage can change. This is the case, for example, when the feeder voltage is derived from an alternating voltage generator driven at greatly varying speed of rotation. Under such conditions, the relative angle of the firing pulse at a constant controlling direct voltage, varies with the cycle period of the feeder voltage because the phase delay of the firing instant always remains the same with a constant control voltage. If, for example, at a given cycle period of the feeder voltage, the angle of the firing pulse is 90°, a prolongation of the cycle period to twice the amount of results in a firing pulse angle of only 45°, assuming the controlling direct voltage remains constant.

It is further necessary that the performance of the control system be unaffected by a reversal in phase sequence. Such reversal occurs in the regulation of a three-phase generator mounted on a vehicle, such as a railroad car, and driven from a wheel shaft of the vehicle.

For these reasons, the known control systems for producing firing pulses are not applicable for uses in which the cycle period of the feeder voltage may vary within wide limits. It is necessary to employ a control system capable of providing a firing pulse whose relative angle remains substantially constant for a given control voltage independently of changes in cycle period of the feeder voltage.

In the copending application of H. Poppinger, Ser. No. 396,950, filed Sept. 16, 1964 and now United States Patent No. 3,349,318 and assigned to the assignee of the present invention, there is disclosed an improved way of solving this problem. The system according to the application controls a load circuit with the aid of a thyristor supplied with periodical firing pulses which are issued whenever the voltage of a capacitor reaches a given limit value, the capacitor being repeatedly charged, each time commencing with the cycle of a periodic voltage. The charging condition reached by the capacitor depends upon a control voltage supplied to a transistor whose collector-emitter path lies parallel to the capacitor, so that the phase position of the firing pulses, relative to the zero passages of the periodic voltage, can be varied at will.

According to the system just described, the discharge of the capacitor and hence the value of potential from which the capacitor commences to be recharged at the beginning of each cycle period varies in dependence upon the control voltage supplied to the transistor. In such a system only a limited portion of the entire control range can be utilized because the discharging of the capacitor, being dependent upon the control voltage, requires a certain amount of time during which no firing pulse can be issued. Such issuance can occur only in the next following active cycle portion. Both the inactive and the active cycle portion thus supplement each other to a complete cycle period of the periodic voltage. Although it is possible to provide for full-range control by combining two control systems of the type last described, this involves a much larger amount of equipment and corresponding greatly increased cost.

It is an object of my invention to devise a system, generally of the above-mentioned type, for controlling thyristors by periodically recurring firing pulses, which affords a considerable enlargement of the control range up to nearly a full cycle period, and which achieves this aim with relatively simple means.

According to my invention, I connect in a system of the above-mentioned type, the emitter-collector path of a transistor directly parallel to the periodically charging and discharging capacitor that issues a firing pulse to the load-controlling thyristor whenever the charge reaches a given limit value, and I impress between collector and base of this shunt transistor a voltage which depends upon the variable control voltage of the system and has the polarity required to turn the transistor on as long as the capacitor voltage is below the possible maximum of the charge limit value and is turned off from the beginning of a cycle period up to the issue moment of a firing pulse; and I supply the capacitor with charging voltage having a frequency corresponding to that of the firing pulses.

According to another feature of my invention, the charging voltage whose frequency is proportional to that of the firing pulses is produced by means of a monostable multivibrator. As is well known, such a multivibrator issues a pulse of a constant time integral of pulse voltage, as soon as an input signal supplied to the multivibrator exceeds a critical value near zero, be it only temporarily. Applicable for thus triggering the multivibrator is a fraction of the blocking voltage impressed upon the thyristors to be controlled. The monostable trigger stage then issues a pulse of constant duration at the beginning of a cycle period or half-wave of the thyristor load voltage. The length of such pulses depends upon the duration of a half-wave of the possible maximal pulse frequency.

According to another feature of my invention, the capacitor charging voltage proportional to the frequency of pulse recurrence may also be produced with the aid of a saturable transformer. It is known that the secondary winding of such a transformer issues pulses of a constant time-voltage integral value, as soon as the core of the transformer is controlled to shift from saturation of one polarity to saturation of the opposite polarity. Such a reversing control may be effected, for example, at the beginning of each cycle period or at the zero passage of the load voltage to be controlled by the thyristors. The pulses produced in this manner are preferably supplied to a smoothing or filtering member, such as an LC or RC member, which furnishes the desired frequency-dependent charging voltage.

The above-mentioned and further objects, advantages and features of my invention will be apparent from, and will be described in, the following with reference to an embodiment of a thyristor control system according to the invention illustrated by way of example in the accompanying drawings, in which.

Figure 1:
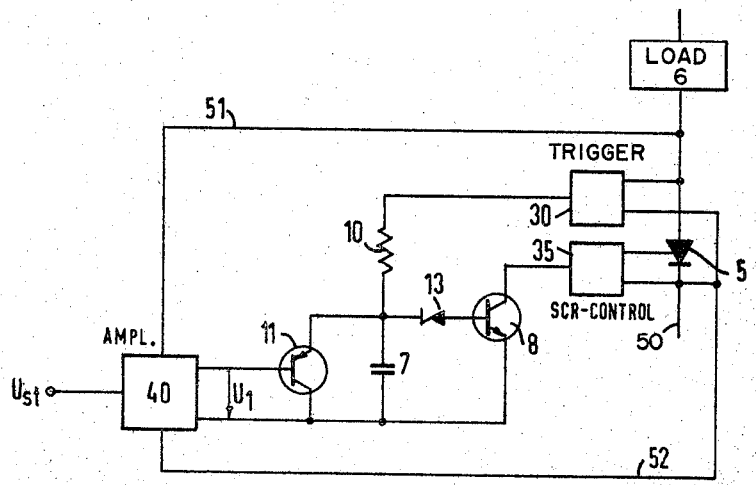
FIG. 1 is a schematic circuit diagram of the thyristor control system.

Referring to FIG. 1, there is shown a bus 50 feeding a load 6 through a series-connected thyristor 5 which controls the flow of current through bus and load. A capacitor 7 is connected through a resistor 10 to a voltage source 30 furnishing an alternating voltage whose median value is proportional to the frequency of recurrence of the firing pulses to be supplied to the thyristor 5. As explained, the voltage source 30 may consist of a monostable trigger stage which receives as control or trigger voltage the blocking voltage impressed upon the thyristor 5, so that the voltage source 30 issues a pulse whenever this blocking voltage becomes only slightly larger than zero.

The capacitor 7 is shunted through a Zener diode 13 in series with the emitter-base path of a transistor 8. The collector current of the transistor controls a firing circuit 35 whose output furnishes the firing pulses to the thyristor 5. These pulses occur each time the voltage at capacitor 7 reaches a maximally possible limit value $u$ determined by the Zener diode 13.

Connected parallel to the capacitor 7 is the emitter-collector path of another transistor 11 whose base-collector path is connected to the output circuit of an amplifier 40. A control voltage $U_{st}$ is applied to the input of the amplifier 40.

Figure 2:
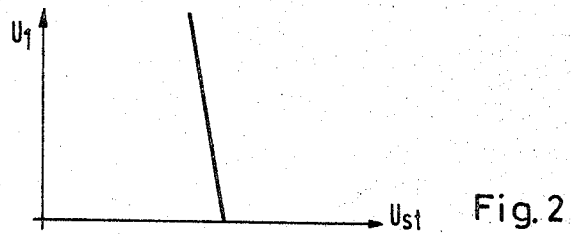
FIGS. 2 and 3 are explanatory graphs relating to the system of FIG. 1.

A characteristic of the amplifier 40 is schematically shown in the diagram of FIG. 2 in which the abscissa indicates values of the control voltage $U_{st}$ and the ordinate represents the amplified output voltage $U_1$. It will be seen from the diagram that at a given maximal control voltage $U_{st}$, the output voltage of the amplifier 40 is approximately equal to zero, and that this output voltage $U_1$ increases with decreasing control voltage $U_{st}$.

The amplifier 40 comprises a device for abruptly increasing the output voltage $U_1$, independently of the control voltage $U_{st}$, to a value larger than the maximal limit value $u$ of the voltage at capacitor 7. This increase is controlled through leads 51 and 52, for example likewise by the voltage at thyristor 5, in such a manner that the increased voltage $U_1$ obtains as long as the blocking voltage is effective upon the thyristor 5.

Figure 3:
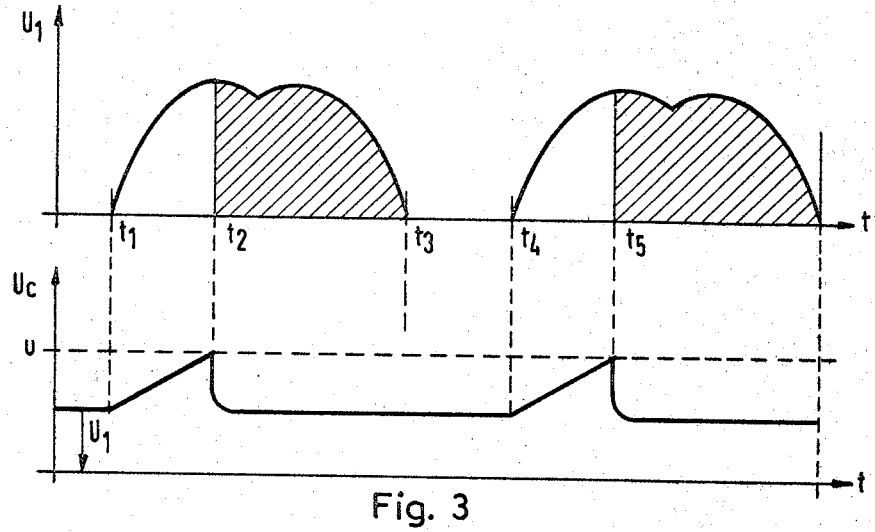

For explaining the functioning of the system according to FIG. 1, reference will be made to FIG. 3 in which the illustrated diagram denotes time ($t$) on the abscissa and voltage on the ordinate. The upper portion of the diagram represents the voltage $U_1$ impressed upon the thyristor 5 versus time. The illustrated voltage curve is typical for a thyristor load voltage resulting from rectification of the alternating voltage between the phase R and the phases S and T of a three-phase system. The lower portion of FIG. 3 represents the time curve of the voltage $U_c$ at the capacitor 7.

Prior to the moment $t_1$, the voltage $U_c$ at capacitor 7 corresponds to the voltage $U_1$ at the output of amplifier 40, neglecting the voltage drop between emitter and base of the transistor 11. In other words, as long as the amplifier 40 furnishes a voltage $U_1$ lower than the possible maximum voltage at capacitor 7, the transistor 11 is turned on, and the volttage at the capacitor constrainedly corresponds to the output voltage of the amplifier 40. The voltage impressed upon the thyristor 5 commences to rise at the moment $t_1$. This causes the amplifier device 40 to abruptly increase the base-collector voltage of transistor 11 to a value above the possible maximum voltage $u$ of the capacitor 7, the latter voltage being determined by the Zener diode 13.

As soon as the transistor 11 at the moment $t_1$ is turned off, the capacitor 7 commences to be charged from the trigger 30, absorbing this charge continuously and independently of the control voltage $U_{st}$. As soon as the increasing voltage at the capacitor 7 reaches the limit voltage $u$, the Zener diode 13 commences to conduct and hence the transistor 8 also commences to conduct. The firing control circuit 35 then issues a firing pulse at the moment $t_2$. This causes the voltage at the thyristor 5 to break down and the output voltage of amplifier 40 to decline back to the value $U_1$ dependent upon the control voltage $U_{st}$. As a result, the transistor 11 is again turned on, and the capacitor 7 is abruptly discharged down to the voltage value $U_1$.

This condition remains preserved until at the moment $t_4$ there again occurs a blocking voltage at the thyristor 5. Then the above-described cycle of functions is repeated.

It is readily apparent from FIG. 3 that the phase position of the firing moment and consequently the angle of the phase or delayed-commutation control is dependent upon the magnitude of the control voltage, provided there obtains a linear relation between this control voltage and the output voltage $U_1$ of the amplifier 40. It is also apparent that the control range virtually corresponds to the entire duration of the individual half-waves. This applies also if a normal rectified alternating voltage is available.

The invention is of particular significance for regulating and controlling the excitation current of generators, particularly three-phase alternators with rectifiers connected to the alternator terminals. Such alternator-rectifier systems are being increasingly employed as power plants on vehicles in lieu of direct current generators. Since the rotating speed of such alternators may vary within wide limits, it is necessary to provide a control system which always furnishes the same relative firing angle at a given control voltage. This is tantamount to requiring that the time spacing of a firing pulse from the beginning of a cycle period be shorter at high frequencies than at low frequencies. This condition is met by a control system according to the invention as described above with reference to FIGS. 1 to 3 and as also embodied in the alternator-control system shown in FIG. 4 and described presently.

Figure 4:
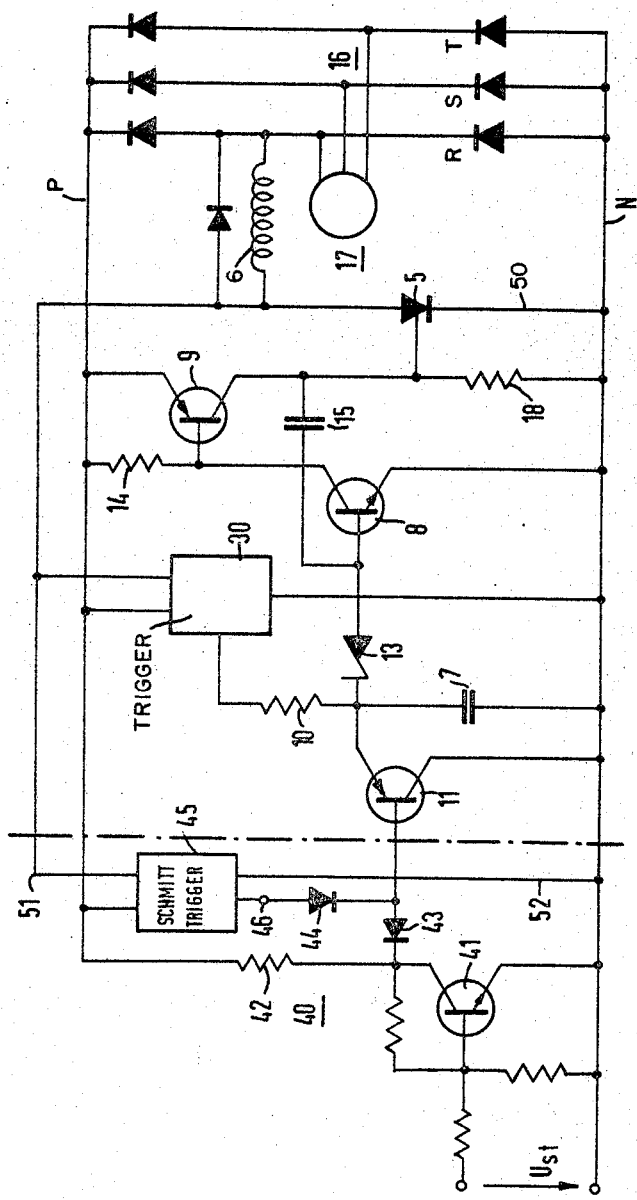
FIG. 4 is a more elaborate circuit diagram exemplifying the system of FIG. 1 in more detail.

Shown at 17 in FIG. 4 is a three-phase alternator operating at greatly variable speeds and in different directions of rotation. The alternator may form part of the electric power plant on a railroad car or automotive vehicle to operate together with a storage battery for supplying the lighting circuits with voltage of substantially constant amplitude despite changes in generator operating conditions. Such a battery may be connected between the buses P and N. The buses P and N are energized from the alternator phases R, S, T through a rectifier bridge network 16. The current flowing from the rectifier through the field winding 6 of the alternator 17 is controlled by a thyristor 5, such as a silicon controlled rectifier. This thyristor corresponds to the one also denoted by 5 in FIG. 1. As far as other circuit components in FIG. 4 correspond to those of FIG. 1, they are also denoted by the same reference characters respectively. Accordingly, the firing pulses for the thyristor 5 are derived from a capacitor 7 acting through a transistor 8. The thyristor firing circuit generally denoted by 35 in FIG. 1 is shown in FIG. 4 to comprise a transistor 9, resistors 14, and 18 and a capacitor 15.

The capacitor 7 is connected in series with resistor 10 to the output of the monostable multivibrator 30 corresponding to the equally designated trigger stage 30 in FIG. 1. Thus, as explained, the charging of the capacitor 7 is determined by the blocking voltage of the thyristor 5. The emitter-collector path of the control transistor 11 is connected in parallel with the capacitor 7. The base of transistor 11 is connected through the output of an amplifier stage 40 still to be described. The base of transistor 8 is connected through a Zener diode to the capacitor 7. When the transistor 8 is turned on, a voltage drop occurs across the resistor 14 in the collector circuit of transistor 8.

This voltage drop displaces the voltage at the base of the transistor 9 to such an extent that said transistor is turned on and supplies a firing pulse to the gate of the thryistor 5 which then conducts a pulse of excitation current through the field winding 6. The collector of the transistor 9 is connected through the capacitor 15 to the base of transistor 8. This feedback connection permits rapid switching of the transistors 8 and 9.

The system of FIG. 4 so far described is similar to the one described in the aforementioned United States Patent No. 3,349,318, but differs essentially therefrom by the circuit components shown in FIG. 4 at the left of the vertical dot-and-dash line and also by the fact that the capacitor 7 is connected with the transistor 8 by the Zener diode 13 and that the charging voltage for said capacitor is not taken from the thyristor 5, but is furnished by the interposed trigger stage 30.

The amplifier 40 according to FIG. 4 comprises a preamplifying stage equipped with a transistor 41 whose emitter-collector path is connected in series with a resistor 42 between the buses P and N, so that the transistor 41 and resistor 42 jointly form a voltage divider. The collector voltage of the transistor 41, therefore, is inversely proportional within a limited range to the controlling input voltage $U_s$. That is, the collector voltage declines with increasing control voltage $U_{st}$.

The base of transistor 11, which is a p-n-p transistor, is connected through a diode 43 with the collector of the transistor 41. The diode 43 is poled to conduct the control current for the transistor 11. Consequently, the voltage at capacitor 7 corresponds to the collector voltage of transistor 41, determined by the control voltage $U_{st}$ and augmented by the voltage drops at diode 43 and at the emitter-base path of transistor 11. Starting from this voltage level, the capacitor 7 is supposed to commence charging at the moment when a blocking voltage appears at the thyristor 5.

For the foregoing purpose, the transistor 11 is blocked as long as the thyristor 5 is blocked. This is effected by means of a transistorized Schmitt trigger 45 of conventional type whose input voltage receives through leads 51, 52 a portion of the voltage impressed upon the thyristor 5. As long as the voltage at the thyristor 5 is above a critical value, the output 46 of the Schmitt trigger stage 45 virtually possesses the potential of the bus P. This output is connected through a diode 44 with the base of the p-n-p transistor 11. Consequently, the transistor is then blocked because its base potential is higher than its emitter potential. However, as soon as the thyristor 5 fires, the voltage of its main path breaks down and the Schmitt trigger 45 switches to its other state in which the output 46 has nearly the negative potential of bus N. The control of the transistor 11 then depends only upon the control voltage $U_{st}$. The system of FIG. 4 thus operates in the manner already explained with reference to FIG. 1 and exhibits the same advantage of increasing the control range over substantially the entire cycle period of the intermittent rectifier voltage.

To those skilled in the art it will be obvious upon a study of this disclosure that my invention permits of various modifications and may be given embodiments other than particularly illustrated and described herein, without departing from the essential features of my invention and within the scope of the claims annexed hereto.

I claim:

1. A system for controlling thyristors by periodically recurring firing pulses, said system comprising a load circuit, including a thyristor and having an intermittent load voltage whose cycle comprises an active interval and a zero voltage interval, said thyristor having a gate control circuit, and a capacitor to be periodically charged and discharged; trigger means connecting said capacitor to said gate control circuit for supplying thereto a firing pulse during each of said active intervals in dependence upon the charge voltage of said capacitor reaching a trigger limit of said trigger means; charge current supply means connected to said capacitor and applying to said capacitor a voltage having a frequency corresponding to the frequency of the firing pulses; variable control voltage supply means for controlling the charging of said capacitor; amplifier circuit means having an input connected to said control voltage supply means; and a transistor having an emitter-collector path connected in parallel with said capacitor and having a collector-base path connected with the output of said amplifier circuit means, said amplifier circuit means having at its output an output voltage dependent upon said control voltage and poled to keep said transistor turned on as long as the voltage at said capacitor is in the vicinity of zero, said transistor being blocked at the beginning of said active voltage intervals up to the instant of a firing pulse, said amplifier circuit means comprising a control device for abruptly increasing the output voltage of said amplifier circuit means to a value above a maximum capacitor voltage, and means connecting said control device to said thyristor for controlling said output voltage in dependence upon the blocking voltage of said thyristor.

2. A system as claimed in claim 1, wherein said charge current supply means comprises a trigger device having an input connected to said thyristor for response to the recurrence of blocking voltage at said thyristor and having an output pulse of constant duration commencing with the beginning of each recurrence.

3. A system as claimed in claim 1, wherein said charge current supply means comprises a monostable trigger having an input connected to said thyristor and having an output pulse of constant duration at each beginning of blocking voltage at said thyristor.

(References on following page)

References Cited

UNITED STATES PATENTS

| | | | |
|---|---|---|---|
| 3,349,318 | 10/1967 | Poppinger | 322—28 |
| 3,151,288 | 9/1964 | Avizienis et al. | 322—28 |
| 3,308,362 | 3/1967 | Neumann et al. | 307—247 X |

ARTHUR GAUSS, *Primary Examiner*.

J. D. FREW, *Assistant Examiner*.

U.S. Cl. X.R.

307—247; 322—28, 73